United States Patent
Duer et al.

(10) Patent No.: US 10,586,050 B2
(45) Date of Patent: Mar. 10, 2020

(54) CONSOLIDATING STATIC ANALYSIS TOOL WARNINGS USING DYNAMIC PROGRAMMING

(71) Applicant: International Business Machines Corporation, Armonk, NY (US)

(72) Inventors: Kristofer Alyn Duer, Manchester, NH (US); Jonathan J. Butler, Manchester, NH (US); John Thomas Peyton, Jr., Arlington, MA (US); Stephen Darwin Teilhet, Milford, NH (US); Omer Tripp, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 15/369,253

(22) Filed: Dec. 5, 2016

(65) Prior Publication Data
US 2018/0157844 A1    Jun. 7, 2018

(51) Int. Cl.
*H04L 29/06* (2006.01)
*G06F 21/57* (2013.01)

(52) U.S. Cl.
CPC ...... *G06F 21/577* (2013.01); *G06F 2221/034* (2013.01)

(58) Field of Classification Search
CPC . G06F 21/577; G06F 2221/033; G06F 21/562
See application file for complete search history.

(56) References Cited

U.S. PATENT DOCUMENTS

2013/0312102 A1\* 11/2013 Brake .................. G06F 21/577
726/25

OTHER PUBLICATIONS

"Knapsack Problem," Wikipedia, publicly available Nov. 2016. Nov. 2016 (Year: 2016).\*
"Knapsack Problem," Wikipedia, publicly available Nov. 2016, https://en.wikipedia.org/wiki/Knapsack_problem.
Gomes, et al, "An overview on the Static Code Analysis approach in Software Development".
Ayewah, et al, "Evaluation Static Analysis Defect Warnings on Production Software," PASTE '07, Jun. 13-14, 2007.
Williamson, D., "IBM Lecture Notes on Approximate Algorithms Fall 1998," pp. 1-25, Feb. 1999.

\* cited by examiner

*Primary Examiner* — Farid Homayounmehr
(74) *Attorney, Agent, or Firm* — Jeffrey S. LaBaw; David H. Judson

(57) ABSTRACT

A static analysis tool is augmented to provide a mechanism by which a large set (and potentially all) security warnings output from the tool may be represented to the user in a manner that is manageable for consumption by the user. According to this disclosure, a static analysis is run on a program to generate a set of security warnings. Using dynamic programming, the set of security warnings output by the static analysis are mapped onto a collection of fix points, wherein a fix point captures a location within the program that should be visited to fix a set of warnings that map to that fix point. The fix points represent the highest probable locations of particular potential vulnerabilities in the program. They are computed in a parametric manner, preferably according to user preferences, by solving an instance of a "knapsack" problem.

18 Claims, 3 Drawing Sheets

CONSOLIDATING STATIC ANALYSIS TOOL WARNINGS USING DYNAMIC PROGRAMMING

BACKGROUND OF THE INVENTION

Technical Field

This disclosure relates generally to identifying and remediating application vulnerabilities using static analysis tools.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data.

To address this deficiency, static analysis tools and services have been developed. Static security analysis (or "static analysis" for short) solutions help organization address web and mobile application vulnerabilities through a secure-by-design approach. This approach embeds security testing into the software development lifecycle itself, providing organizations with the tools they require to develop more secure code. Static analysis tools are often used by computer software developers to provide information about computer software while applying only static considerations (i.e., without executing a computer software application). Such tools simplify remediation by identifying vulnerabilities in web and mobile applications prior to their deployment, generating results (reports and fix recommendations) through comprehensive scanning, and combining advanced dynamic and innovative hybrid analyses of glass-box testing (run-time analysis, also known as integrated application security testing) with static taint analysis for superior accuracy. A representative commercial offering of this type is IBM® Security AppScan®, which enhances web application security and mobile application security, improves application security program management and strengthens regulatory compliance.

Typically, application analysis tools of this type produce security "findings" that summarize security vulnerabilities residing in application source code. A complete set of static security findings typically are modeled as "traces," wherein a trace is a code execution path that starts with a "source" (which is vulnerable to malicious user input), passes through one or more internal nodes, and ends in a "sink" (which has a security impact to an application). A warning is a trace through the program. After being generated by an analysis engine, these traces typically are then presented in a user interface of the security software. While these techniques provide very useful information to the developer, multiple traces may contain many common nodes that only differ in a small number of nodes. As a result, often the findings (or "reports") are difficult to consume, especially as the number of possible traces becomes very large. In such a circumstance, a user can easily lose focus on which findings should have priority for investigation and mitigation.

Several techniques have been developed to address the problem of having too many findings. One approach involves combining two heuristics. First, the warnings are prioritized and sorted according to their severity, such that a greedy algorithm can then be applied when reviewing the processed reports, starting from the most critical ones. Second, a static analysis model used to evaluate the findings is parameterized by one or more factors (e.g., an extent to which heap updates and virtual calls are resolved, etc.) to create different bounds governing the model's behavior. While both of these heuristics reduce the number of reported warnings, they provide only a partial view of the complete output of the static analysis. This often translates into a partial representation of the concerns that the user should address.

There remains a need to provide the user a representation of an entire set of warnings output by the analysis, but in a way that is manageable to review.

BRIEF SUMMARY

A static analysis tool is augmented to provide a mechanism by which a large set (and potentially all) security warnings output from the tool may be represented to the user in a manner that is manageable for consumption by the user. According to this disclosure, a static analysis is run on a program to generate a set of security warnings. Using dynamic programming, the set of security warnings output by the static analysis are mapped onto a collection of fix points, wherein a fix point captures a location within the program that should be visited to fix a set of warnings that map to that fix point. The fix points represent the highest probable locations of particular potential vulnerabilities in the program. They are computed in a parametric manner, preferably according to user preferences, by solving an instance of a "knapsack" problem.

According to a first aspect, a method of static security analysis begins by receiving a set of traces generated from performing a static analysis of application source code, wherein a trace represents a code execution path in the application source code. The set of traces are then mapped onto locations within the set of traces, the locations representing a minimum number of fix points of potential vulnerabilities in the application source code. This mapping of the set of traces onto the fix points is accomplished by executing a computation over an instance of a knapsack problem. The fix points are then output for further analysis and potential remediation.

According to a second aspect of this disclosure, an apparatus for static security analysis is described. The apparatus comprises a set of one or more hardware processors, and computer memory holding computer program instructions executed by the hardware processors to perform a set of operations such as described above.

According to a third aspect of this disclosure, a computer program product in a non-transitory computer readable medium for use in a data processing system for static security analysis is described. The computer program product holds computer program instructions executed in the data processing system and operative to perform operations such as described above.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
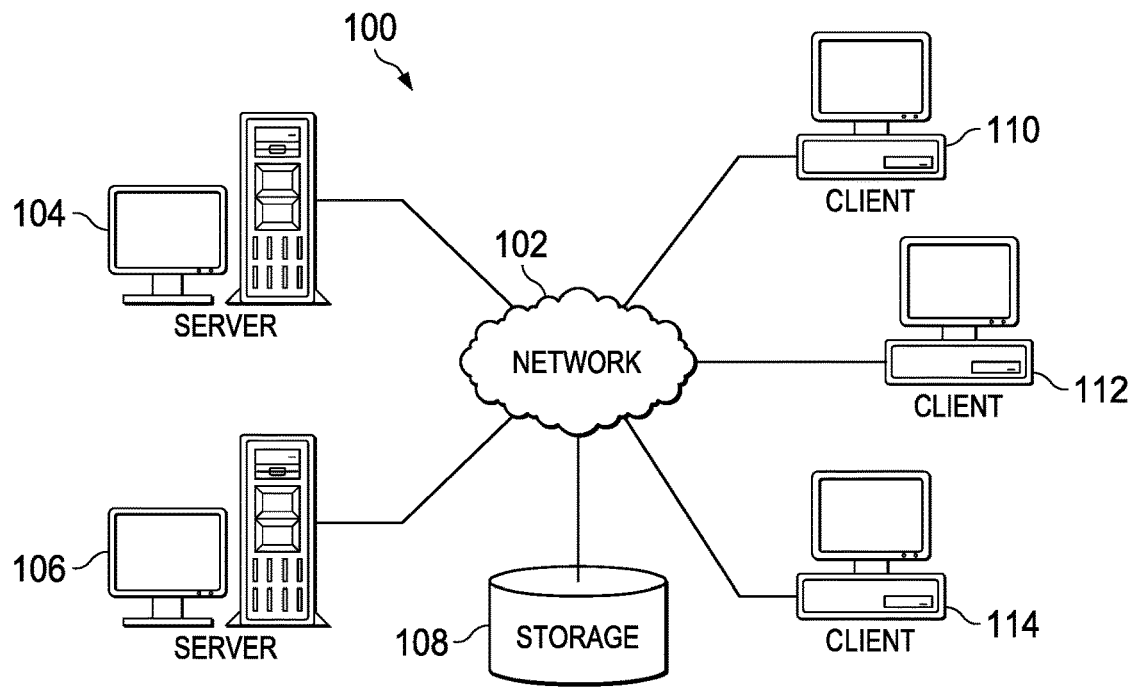
FIG. 1 depicts an exemplary block diagram of a distributed data processing environment in which exemplary aspects of the illustrative embodiments may be implemented.
Figure 2:
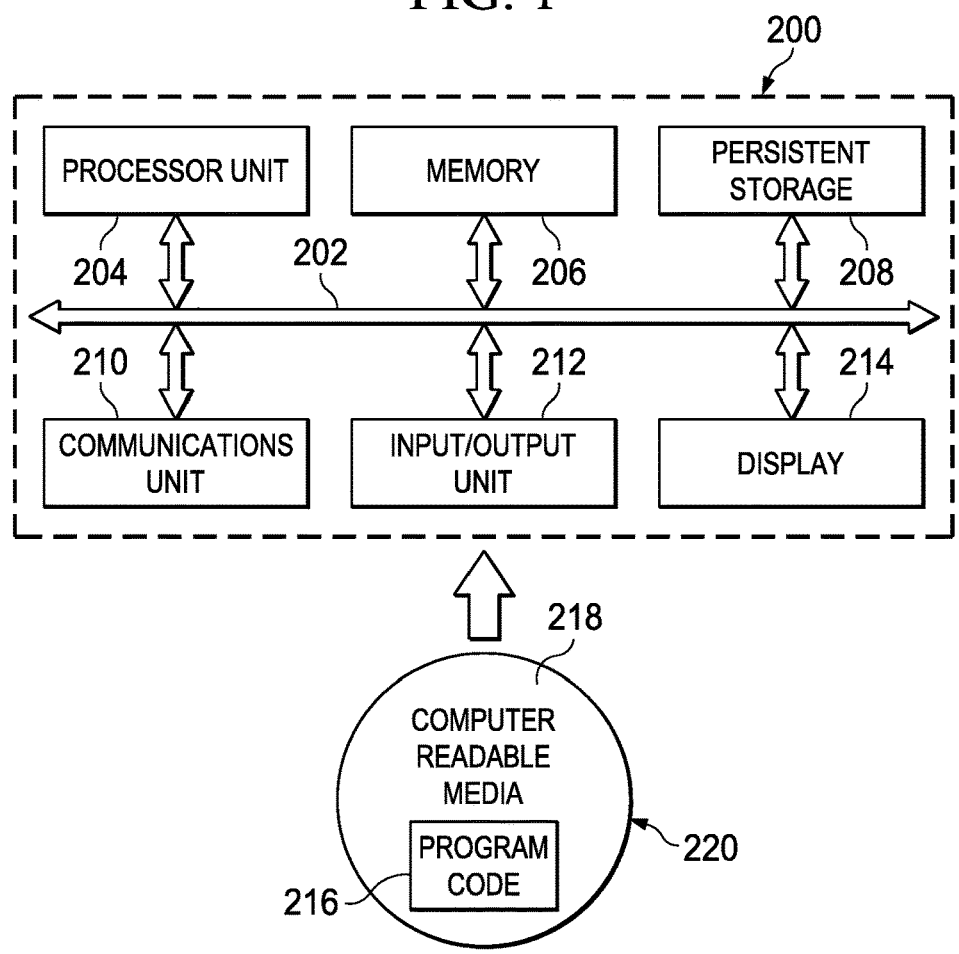
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the subject matter.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

The Service Models for cloud computing typically are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations.

Figure 3:
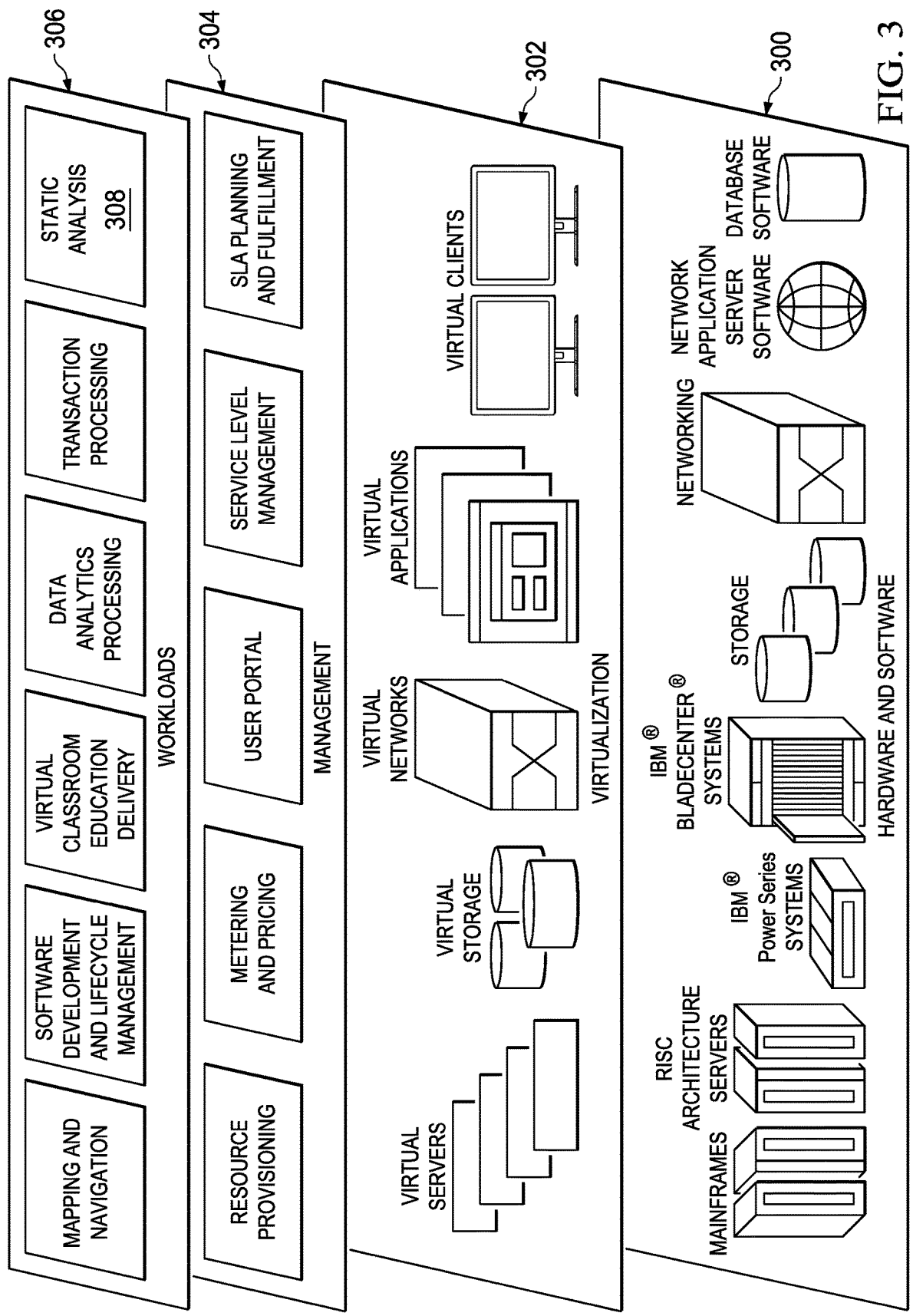
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® System z; RISC (Reduced Instruction Set Computer) architecture based servers, in one example IBM Power Systems; IBM BladeCenter® systems; storage devices; networks and networking components. Examples of software components include network application server software, in one example IBM WebSphere® application server software; and database software, in one example IBM DB2® database software. (IBM, System z, Power Systems, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

Management layer 304 may provide one or more functions, such as Resource provisioning, which provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include static security analysis 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM systems as described above with VMware vSphere 4.1 Update 1 and 5.0.

In one embodiment, a static analysis tool, such as IBM AppScan Enterprise Edition, is implemented as a cloud-based application.

Static Analysis Tools and Services

As is well-known, static analysis tools are used by computer software developers to provide information about computer software while applying only static considerations (i.e., without executing a computer software application). More formally, and as used herein, the term "static program analysis" means an analysis of a static representation of an application. In one type of static analysis, data flows are traced within a computer software application from "sources," typically application programming interfaces (API) that introduce "untrusted" input into a program, such as user input, to "sinks," typically security-sensitive operations such as modifying a database. More generally, the term "sink" or "security sink" means a module, function or procedure that consumes in input value and performs an operation on the input value that is security sensitive.

Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Generalizing, a "downgrader" refers to a module, routing or function that endorses, sanitizes and/or validates input data. Static analysis tools that identify security vulnerabilities typically provide computer software developers with a short description of each type of security vulnerability found, and may even provide sample code snippets that may be used by the developer to construct a downgrader for remediating the security vulnerability.

In operation, a static program analysis may analyze a call-tree representing previously recorded call stacks of the application to identify security vulnerabilities that may be present in the application. The term "call stack" refers to a stack data structure that stores information about the active subroutines of a computer program, such as an application. Without limitation, the static security analysis typically takes the form of taint analysis, where the analysis is parameterized by a set of security rules, each rule being a triple <Source, San, Sink>, where Source denotes source statements that read untrusted user inputs, San denotes downgrader statements that endorse untrusted data by validating and/or sanitizing it, and Sink denotes sink statements which perform security-sensitive operations. Given a security rule R, any flow from a source in $Source_R$ to a sink in $Sink_R$ that does not pass through a downgrader from $San_R$ comprises a potential vulnerability. This approach thus reduces security analysis to a graph reachability problem.

During static analysis of the computer program, the security analysis application analyses the computer model represented by the control flow call-graph, to determine whether there are potential paths, during execution of the computer program, from the source to the sink without the user-provided data being downgraded by the downgrader. One such path is indicated in the call-graph by an edge. This path generally is undesirable, and may indicate a security vulnerability in the computer program. In this regard, the edge can represent a witness to a security vulnerability, and this witness is then reported as a "finding" to the user.

Figure 4:
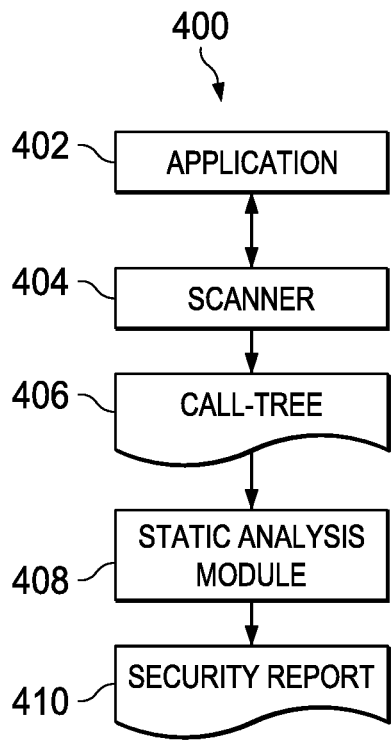
FIG. 4 is a block diagram illustrating a technique for analyzing vulnerable information flows in an application.

FIG. 4 is a block diagram illustrating a system 400 for analyzing vulnerable information flows in an application 402. In this known scenario, static analysis is used in addition to a black-box scan. As seen in FIG. 4, while the application 402 executes, the scanner 404 performs a scan of the application and, based on the scan, generates a call-graph 406 representing call stacks arising in the application during processing of test inputs provided to the application 402. The call-graph 406 may be pre-generated or provided from some other data source (e.g., a configuration file). As depicted, the system 400 includes a static analysis module 408 that performs a static analysis of the application 402. Specifically, the static analysis module 408 performs a static analysis of the call-graph 406 in which the call stacks identified by the black-box scanner 404 are recorded. As described above, in this way the static analysis module 408 can identify paths (i.e., flows) in the call-graph 406 that potentially represent security vulnerabilities in the application 402. For example, the static analysis module 408 can generate a security report 410 that indicates such paths as witnesses to security vulnerabilities. Security report 410 can be made to be available to a user in any suitable manner. For example, security report 410 can be presented on a display, presented in a printout, stored to a file, or the like.

Dynamic Programming

By way of additional background, dynamic programming (also known as dynamic optimization) is a method for solving a complex problem by breaking it down into a collection of simpler sub-problems, solving each of those sub-problems just once, and storing their solutions, e.g., using a memory-based data structure. In this manner, when the sub-problem re-occurs, the previously-computed solution is looked up (in lieu of re-computation), thereby saving computation time as a tradeoff to storage space. To facilitate look-up, typically each sub-problem solution is indexed, e.g., based on the values of one or more parameters.

Dynamic programming algorithms are often used for optimization. A dynamic programming algorithm examines the previously solved sub-problems and then combines their solutions to give the best solution for the given problem.

A known dynamic programming algorithm is the knapsack. In particular, knapsack problems are a typical application of integer programming (IP). Integer programming expresses the optimization of a linear function subject to a set of linear constraints over integer variables. In knapsack problems, there is a container (the "knapsack") with a fixed capacity (an integer) and a number of items. Each item has an associated weight (an integer) and an associated value (another integer). The problem consists of filling the knapsack without exceeding its capacity, while maximizing the overall value of its contents.

More formally, the classic knapsack formulation is in terms of a set $\{i_1, \ldots i_n\}$ of items, such that each item $i_k$ has an associated weight $w(i_k)$ and profit $p(i_k)$. There is also a weight limit, $W_v$, over the knapsack. The goal is to fit the subset of the items $i_k$ into the knapsack, such that their total weight is no more than W and the overall profit is maximized. The knapsack formulation is known as 0|1 knapsack problem. A Java-based programming solution exists for it, which runs in pseudo-polynomial time. One such program is javaknapsack.mod, which is available in the IBM ILOG CPLEX Optimization Studio 12.4.0.

Consolidating Security Warning Outputs Via Dynamic Programming

With the above as background, the subject matter of this disclosure is now described. In this approach, a static security analysis tool is augmented (i.e., extended or enhanced) to provide a user with a way to manage a large set of findings that may otherwise be difficult to triage and parse. In particular, a mechanism is provided to quickly identify, using the knapsack problem, a set of "fix" points, which are the highest probability locations of particular potential vulnerabilities in the application code. The notion of "highest" here may be a relative determination. With these fix points in hand, the user can then focus his or her remediation activities appropriately. While a preferred approach is to implement the mechanism within the static security analysis tool itself, this is not a requirement, as the solution may be implemented in a standalone manner.

One approach to applying the knapsack problem in this context (namely, mapping security warnings to fix points, where a warning is trace through the program) is to formulate (encode) the problem as follows: (i) for each step (or location) s along a given trace, let the weight of that step be the number of warning types that traces going through s map to; and (ii) for each step (or location) s along a given trace, let the profit associated with that step be the number of warning traces that contain s. This encoding is sometimes referred to herein as a "location minimization rule." Intuitively, and given the above-identified encoding, a best-case scenario of high profit and low weight is achieved when many traces go through a common location s, and they all map to the same warning type (thereby requiring the same fix). In this context, location s thus is a useful point for fixing the problem or otherwise gaining access to the context surrounding it. Given the above knapsack instance, in this approach the mechanism iterates W (i.e., the capacity of the knapsack) starting from 1, and until a sufficiently high value is reached, such that a selection of fix points that forms a "cover" of all the given traces is generated. More generally, a "cover" refers to a set S of locations, such that each trace goes through at least one location contained in S. The knapsack solver is then executed over this formulation, with the result being the selection of items (locations) to fit into the knapsack.

While the above approach is useful, a preferred embodiment is as follows. In this embodiment, the knapsack solver attempts to address an "inverse" of that formulation, namely, a minimal set of fix points that already forms a cover. To achieve this formulation, the knapsack formulation is then as follows: (i) for each step (or location) s along a given trace, let the weight of that step be the overall number of warning types minus a number of warning types that traces going through s map to; and (ii) for each step (or location) s along a given trace, let the profit associated with that step be the overall number of warnings minus the number of warnings that contain s. Here, too, the mechanism iterates W, but in this embodiment, the routine starts from a high number and checks if the remaining locations (i.e., those not inserted into the knapsack) form a cover. The iterative solver stops when this condition holds true, and it then outputs those locations as the recommended fix points. These recommended fix points represent the highest probability (or, more generally, probable) locations of particular potential vulnerabilities where remediation efforts should be prioritized or otherwise focused. As compared to naïve approaches, e.g., that search every theoretical code path, the technique of this disclosure is much more computationally-efficient, and it provides a much more constrained set of findings that can then be the subject of the user's triage and remediation efforts.

Generalizing, the approach herein receives a set of warnings comprising locations and warning types and indicating potential security vulnerabilities in program code. The set of warnings is then analyzed using a location minimization rule that is parameterized according to at least one warning type and, in particular, wherein a weight metric at a location is calculated according to a user-tunable weighting by a warning type. The weight metric is then iterated using dynamic programming (viz., a knapsack algorithm) to determine a minimum number of locations that are recommended to fix the warning type. The location minimization rule preferably includes a calculation of an overall number of warnings minus a number of warnings that contain the location.

In operation, the knapsack algorithm receives a data set that is generated from the static security analysis. In particular, the data set includes a set $\{i_1, \ldots i_n\}$ of items, such that each item $i_k$ has an associated weight $w(i_k)$ and profit $p(i_k)$. Here, the items are the steps (or locations) along a given trace. For each such item, the associated weight is then an overall number of warning types minus a number of warning types to which traces going through s map, and the associated profit is an overall number of warnings minus the number of warnings that contain the location s. Using this data set, the mechanism iterates over a function W (of the weight values) by starting from an initial value and checking if remaining locations (i.e., those not inserted into the knapsack) form a cover, which is a construct defined as a set S of locations, such that each trace goes through at least one location contained in S. If so (i.e., when the remaining locations form the cover), the iterative solver stops, and it then outputs those locations (namely, those that form the cover) as the recommended fix points. As noted above, these recommended fix points represent the highest probability (or, more generally, probable) locations of particular potential vulnerabilities where remediation efforts should be prioritized or otherwise focused.

As noted above, in a conventional static analysis, the SAST software (such as IBM AppScan Source) takes application source code as input, and performs security analysis. The tool produces results containing one or more security vulnerability findings. This result typically is output into an XML file. According to this disclosure, those findings are then processed using the dynamic programming approach herein to provide a subset or "consolidated" set of findings for further analysis. For example, a representative output may include a set of rows, where each row corresponds to a call graph, and each call graph typically includes many function calls. Thus, the trace field in the row represents a code execution path in the original application code that was subjected to the static analysis and the follow-on dynamic programming of this disclosure, and each number in the trace field represents a coded function call in a specific location of a specific file. This trace information is exposed to the user (e.g., on a user interface, in a printed report, or otherwise) for further analysis, investigation and remediation. The particular manner in which such activities are carried out is not an aspect of this disclosure.

Thus, according to this disclosure, the SAST software is modified (or augmented) to provide knapsack-based dynamic programming to the traces in the results file.

Figure 5:
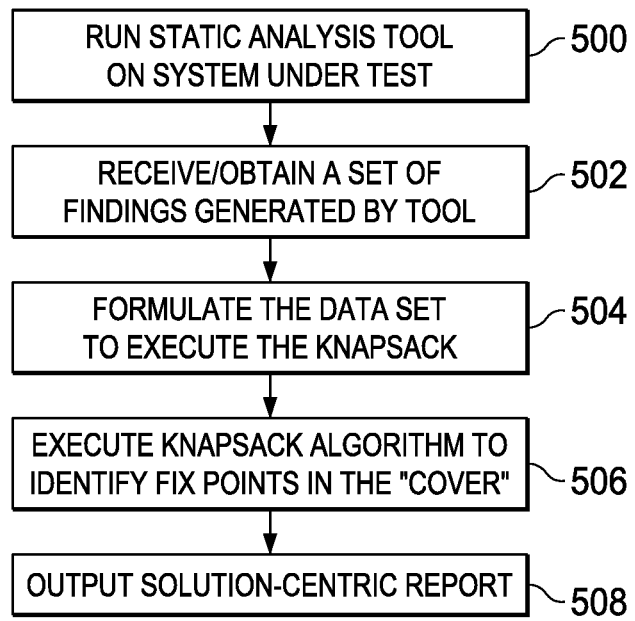
FIG. 5 is a process flow depicting a preferred technique of this disclosure for consolidating warnings output by static analysis using dynamic programming.

Generalizing, FIG. 5 depicts a process flow of a representative embodiment. In this approach, a method of static security analysis uses dynamic programming, namely, solving an instance of a knapsack problem, to identify important security vulnerability locations (within code paths) as follows. The process begins at step 500 in a conventional SAST tool; in particular, in response to receiving an application source code as input, the application source code is analyzed, typically in multiple iterations, to produce a set of traces. As depicted in FIG. 4, and as described above, typically there is one trace per iteration. At step 502, each trace is formatted into and provided as a markup language file (such as XML). At step 504, and as described, a data set representing the set of traces is formulated as a knapsack problem. In particular, preferably this operation entails the following encoding: (i) for each step (or location) s along a given trace, let the weight of that step be the overall number of warning types minus a number of warning types that traces going through s map to; and (ii) for each step (or location) s along a given trace, let the profit associated with that step be the overall number of warnings minus the number of warnings that contain s. Then, at step 506, an instance of a knapsack algorithm is executed against this data set to identify the fix points. In one embodiment, the knapsack algorithm is implemented as Java code, such as javaknapsack.mod, which is available the IBM ILOG CPLEX Optimization Studio 12.4.0. Based on this computation, the operation 506 identifies the "cover," which as noted represents a minimum set of points that are probable locations for potential security vulnerabilities. At step 508, the resulting entries (the locations, or steps along the relevant traces) are then presented (output) to a user. Step 508 may involve providing a visual output, a programmatic output, or some combination. Thereafter, a vulnerability mitigation operation is implemented with respect to fix point identified from the dynamic programming analysis. This completes the process.

The technique described herein provides significant advantages. It enables static analysis findings to be reported in a consolidated way (e.g., by enabling one fix point to represent many common nodes), thereby enabling the user to readily identify the places in the code that may need to be analyzed for security vulnerabilities. By using the knapsack-based dynamic programming technique to simplify the SAST trace draft in the manner described, the user can identity, test and potentially address problems with potentially fault-generating code paths as compared to the brute force examination of the raw trace data that is done in the prior art. Generalizing, the approach herein takes a set of traces and identifies potential fix points that are then examined for potential security vulnerability.

Generalizing, the use of a dynamic programming-based technique in this manner provides a way to optimize traces identified by the static analysis software. While the inverse knapsack formulation (to generate the "cover") is the preferred technique for trace optimization according to this disclosure, other knapsack-based techniques may be used depending on implementation.

As previously noted, the described approach may be implemented in a standalone machine executing a SAST tool, or in a tool that is web- or cloud-based.

Preferably, the techniques herein are implemented in associated with a static analysis tool, such as IBM Security AppScan Source. The reference to this commercial product is exemplary and should not be taken to limit the disclosed technique, which may be implemented on any appliance (or, more generally, machine) having the general characteristics and operating functionality that has been described.

This subject matter may be implemented as-a-service. As previously noted, and without limitation, the subject matter may be implemented within or in association with a cloud-based analytic platform system or appliance, or using any other type of code analysis systems, products, devices, programs or processes. As has been described, the knapsack-based analysis functionality may be provided as a standalone function, or it may leverage functionality from other products and services.

Generalizing, a representative cloud application platform with which the trace optimization and visualization technique may be implemented includes, without limitation, any standalone or cloud-supported Static Application Security Testing (SAST) framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions described be executed by a particular component as named above, as the functionality herein (or any aspect thereof) may be implemented in other or systems.

The knapsack-based dynamic programming functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, static security analysis tools and systems, as well as improvements to the functioning of data trace processing techniques generally.

Having described the invention, what we claim is as follows.

The invention claimed is:

1. A method to improve a static security analysis tool, comprising:
receiving a set of traces generated from performing a static analysis of application source code, wherein a trace represents a code execution path in the application source code;
encoding an instance of a knapsack problem based at least in part on data obtained from the set of traces;
executing a computation over the instance of the knapsack problem, thereby mapping the set of traces onto locations within the set representing a minimum number of fix points of potential vulnerabilities in the application source code;
outputting the fix points for further analysis; and
performing a mitigation operation with respect to at least one of the outputted fix points.

2. The method as described in claim 1 wherein the instance of the knapsack problem comprises a data set that includes a set $\{i_1, \ldots i_n\}$ of items, such that each item $i_k$ has an associated weight $w(i_k)$ and profit $p(i_k)$.

3. The method as described in claim 2 wherein the items are each a location s along a trace, wherein for each such item an associated weight is an overall number of warning types minus a number of warning types to which traces going through s map, and the associated profit is an overall number of warnings minus a number of warnings that contain the location s.

4. The method as described in claim 3 wherein evaluation of the knapsack problem iterates over a weight function comprising the weights.

5. The method as described in claim 4 wherein iterating over the weight function starts from an initial value and ends when a given subset of the locations has been determined, the given subset of locations being such that each trace goes through at least one location contained in the given subset; wherein the given subset represents the fix points.

6. The method as described in claim 1 wherein the mapping applies a location minimization rule that is parameterized according to at least one warning type, wherein a weight at a location along a trace is calculated according to a user-tunable weighting by a warning type.

7. Apparatus, comprising:
a processor;
computer memory holding computer program instructions executed by one or more processors to improve an operation of a static security analysis tool, the computer program instructions configured to:

receive a set of traces generated from performing a static analysis of application source code, wherein a trace represents a code execution path in the application source code;

encode an instance of a knapsack problem based at least in part on data obtained from the set of traces;

execute a computation over the instance of the knapsack problem, to thereby map the set of traces onto locations within the set representing a minimum number of fix points of potential vulnerabilities in the application source code;

output the fix points for further analysis; and perform a mitigation operation with respect to at least one of the outputted fix points.

8. The apparatus as described in claim 7 wherein the instance of the knapsack problem comprises a data set that includes a set $\{i_1, \ldots i_n\}$ of items, such that each item $i_k$ has an associated weight $w(i_k)$ and profit $p(i_k)$.

9. The apparatus as described in claim 8 wherein the items are each a location s along a trace, wherein for each such item an associated weight is an overall number of warning types minus a number of warning types to which traces going through s map, and the associated profit is an overall number of warnings minus a number of warnings that contain the location s.

10. The apparatus described in claim 9 wherein the computer program instructions are operative to evaluate the knapsack problem by iterating over a weight function comprising the weights.

11. The apparatus as described in claim 10 wherein iterating over the weight function starts from an initial value and ends when a given subset of the locations has been determined, the given subset of locations being such that each trace goes through at least one location contained in the given subset;

wherein the given subset represents the fix points.

12. The apparatus as described in claim 7 wherein computer program instructions to map the set of traces include computer program instructions operative to apply a location minimization rule that is parameterized according to at least one warning type, wherein a weight at a location along a trace is calculated according to a user-tunable weighting by a warning type.

13. A computer program product in a non-transitory computer readable medium for use in one or more data processing systems, the computer program product holding computer program instructions executed by the one or more data processing systems to improve a static security analysis tool, the computer program instructions configured to:

receive a set of traces generated from performing a static analysis of application source code, wherein a trace represents a code execution path in the application source code;

encode an instance of a knapsack problem based at least in part on data obtained from the set of traces;

execute a computation over the instance of the knapsack problem to thereby map the set of traces onto locations within the set representing a minimum number of fix points of potential vulnerabilities in the application source code;

output the fix points for further analysis; and perform a mitigation operation with respect to at least one of the outputted fix points.

14. The computer program product as described in claim 13 wherein the instance of the knapsack problem comprises a data set that includes a set $\{i_1, \ldots i_n\}$ of items, such that each item $i_k$ has an associated weight $w(i_k)$ and profit $p(i_k)$.

15. The computer program product as described in claim 13 wherein the items are each a location s along a trace, wherein for each such item an associated weight is an overall number of warning types minus a number of warning types to which traces going through s map, and the associated profit is an overall number of warnings minus a number of warnings that contain the location s.

16. The computer program product described in claim 15 wherein the computer program instructions are operative to evaluate the knapsack problem by iterating over a weight function comprising the weights.

17. The computer program product as described in claim 16 wherein iterating over the weight function starts from an initial value and ends when a given subset of the locations has been determined, the given subset of locations being such that each trace goes through at least one location contained in the given subset;

wherein the given subset represents the fix points.

18. The computer program product as described in claim 13 wherein computer program instructions to map the set of traces include computer program instructions operative to apply a location minimization rule that is parameterized according to at least one warning type, wherein a weight at a location along a trace is calculated according to a user-tunable weighting by a warning type.

\* \* \* \* \*